(12) United States Patent
Seo

(10) Patent No.: US 12,093,840 B2
(45) Date of Patent: Sep. 17, 2024

(54) METHOD OF TRAINING OBJECT PREDICTION MODELS USING AMBIGUOUS LABELS

(71) Applicant: SI Analytics Co., Ltd., Daejeon (KR)

(72) Inventor: Junghoon Seo, Daejeon (KR)

(73) Assignee: SI Analytics Co., Ltd., Daejeon (KR)

( * ) Notice: Subject to any disclaimer, the term of this patent is extended or adjusted under 35 U.S.C. 154(b) by 0 days.

(21) Appl. No.: 18/092,635

(22) Filed: Jan. 3, 2023

(65) Prior Publication Data

US 2023/0214674 A1 Jul. 6, 2023

(30) Foreign Application Priority Data

Jan. 3, 2022 (KR) .......... 10-2022-0000169
Aug. 24, 2022 (KR) .......... 10-2022-0105877

(51) Int. Cl.
*G06N 20/00* (2019.01)
*G06N 3/08* (2023.01)
*G06N 5/022* (2023.01)

(52) U.S. Cl.
CPC ............ *G06N 5/022* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,779,354 B2 | 10/2017 | Hagawa et al. | |
| 10,474,713 B1 | 11/2019 | Kim et al. | |
| 10,970,598 B1 | 4/2021 | Ryu et al. | |
| 2016/0260014 A1 | 9/2016 | Hagawa et al. | |
| 2018/0096243 A1* | 4/2018 | Patil ...................... | G06N 3/084 |
| 2018/0373979 A1* | 12/2018 | Wang ................ | G06F 18/24143 |
| 2020/0349464 A1* | 11/2020 | Lin ......................... | G06V 10/82 |
| 2022/0129706 A1* | 4/2022 | Vivona ............... | G06F 18/2155 |

FOREIGN PATENT DOCUMENTS

| | | |
|---|---|---|
| KR | 1020200047306 A | 5/2020 |
| KR | 1020210084330 A | 7/2021 |
| KR | 102310612 B1 | 10/2021 |
| KR | 1020210119944 A | 10/2021 |
| KR | 1020210133827 A | 11/2021 |
| KR | 1020210143948 A | 11/2021 |

OTHER PUBLICATIONS

Rodrigues et al., Deep hashing for multi-label image retrieval: a survey, 2020, Artificial Intelligence Review (2020) 53:5261-5307 (Year: 2020).*
Mayoore S. Jaiswal et al., "MUTE: Inter-class Ambiguity Driven Multi-hot Target Encoding for Deep Neural Network Design", 2020 IEEE/CVF Conference on Computer Vision and Pattern Recognition Workshops (CVPRW), Jun. 14-19, 2020.
Timothee Cour et al., "Learning from Partial Labels", Journal of Machine Learning Research 12 (2011) 1501-1536.

* cited by examiner

*Primary Examiner* — David R Vincent
(74) *Attorney, Agent, or Firm* — Umberg Zipser LLP

(57) ABSTRACT

Disclosed is a method of training an object prediction model by using input data and a discrimination label including a plurality of discrimination information by a computing device including at least one processor which is a training method including: generating a prediction label based on the input data by using the prediction model; generating a loss value based on a discrimination label corresponding to the input data and the prediction label; and training the prediction model based on the loss value.

6 Claims, 9 Drawing Sheets

【FIG.1】
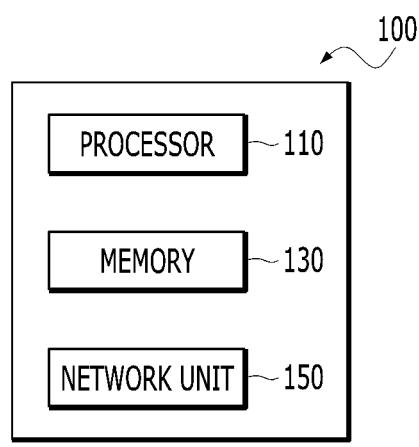

[FIG.2]
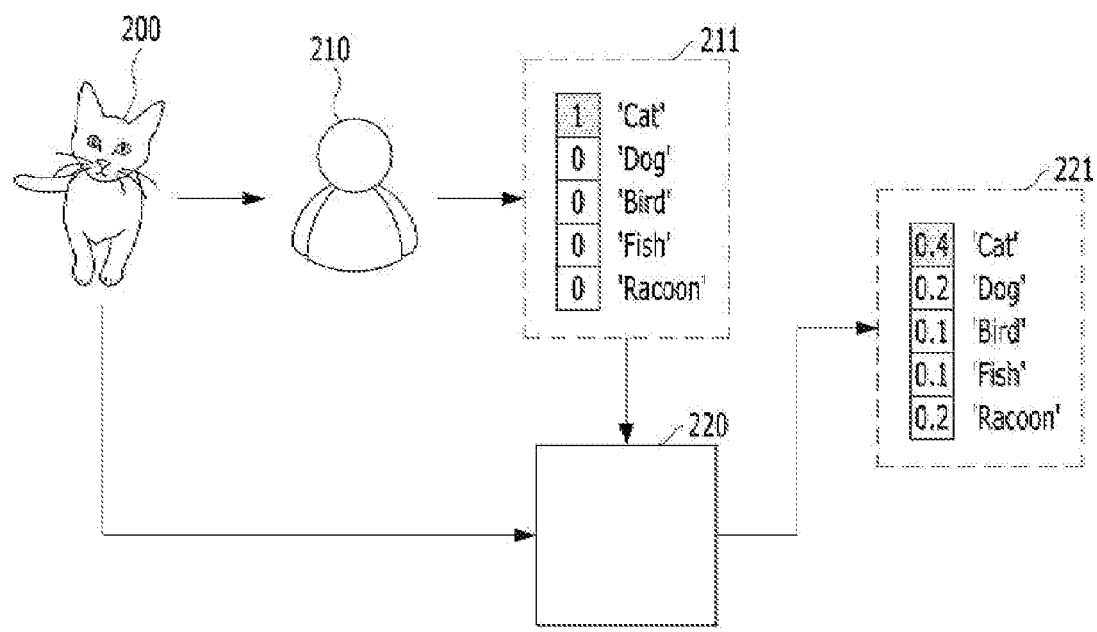

[FIG.3]
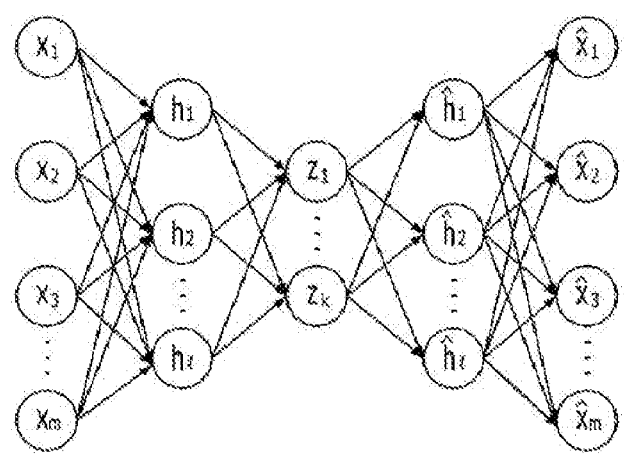

[FIG.4]
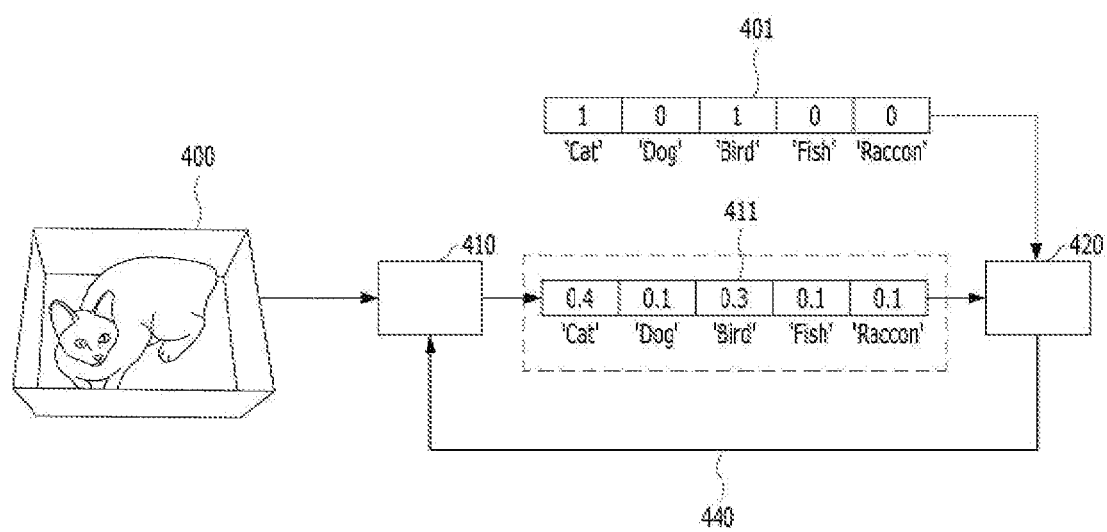

[FIG.5]
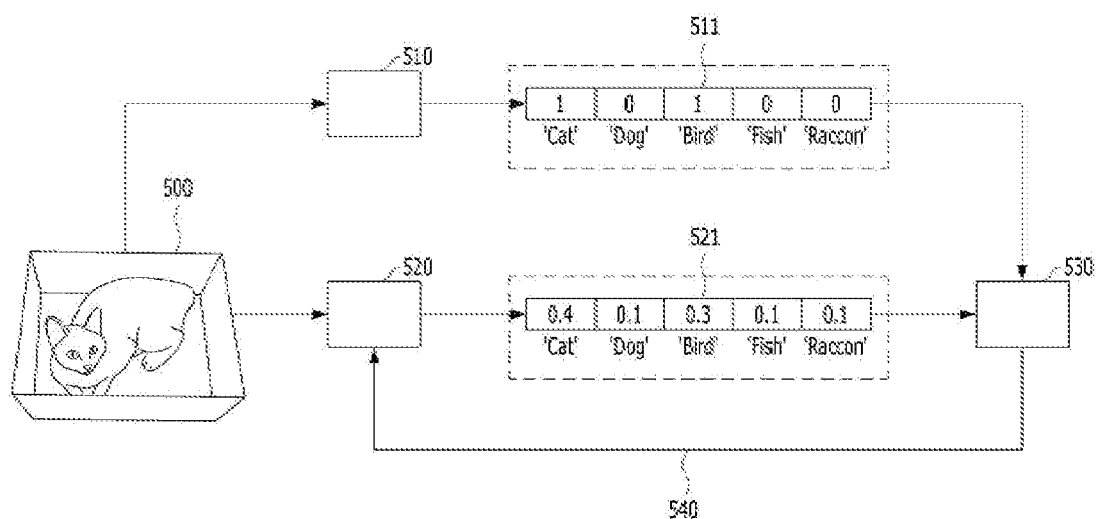

[FIG.6]
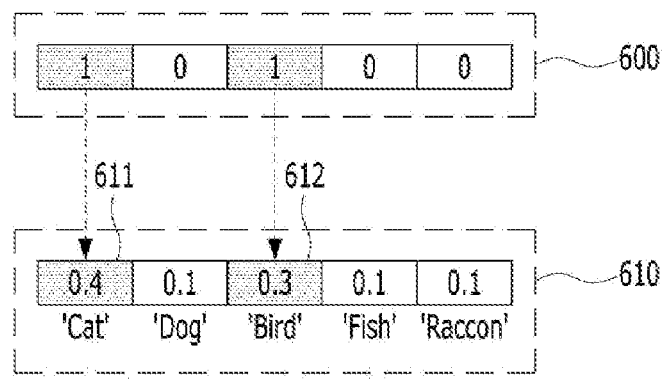

[FIG.7]
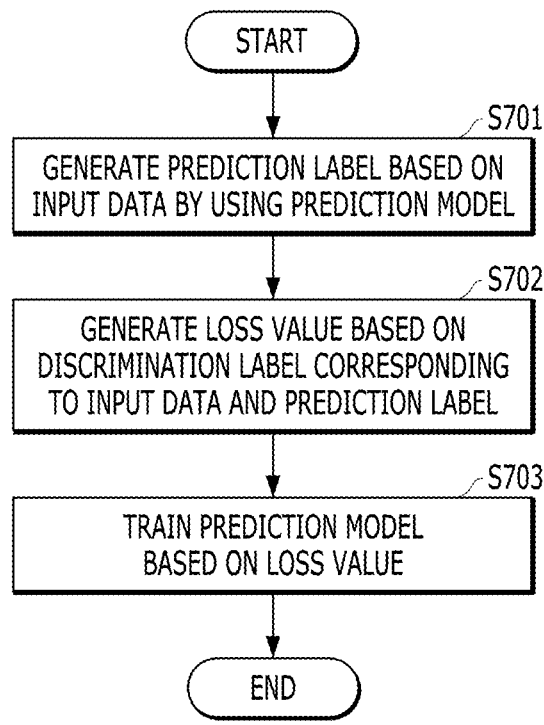

[FIG.8]
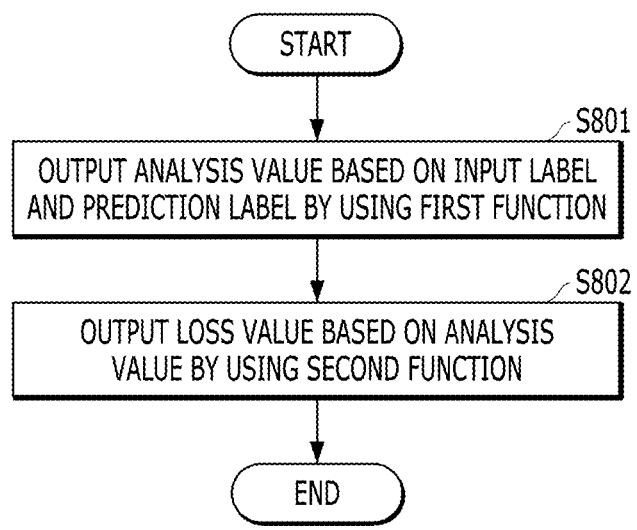

[FIG.9]
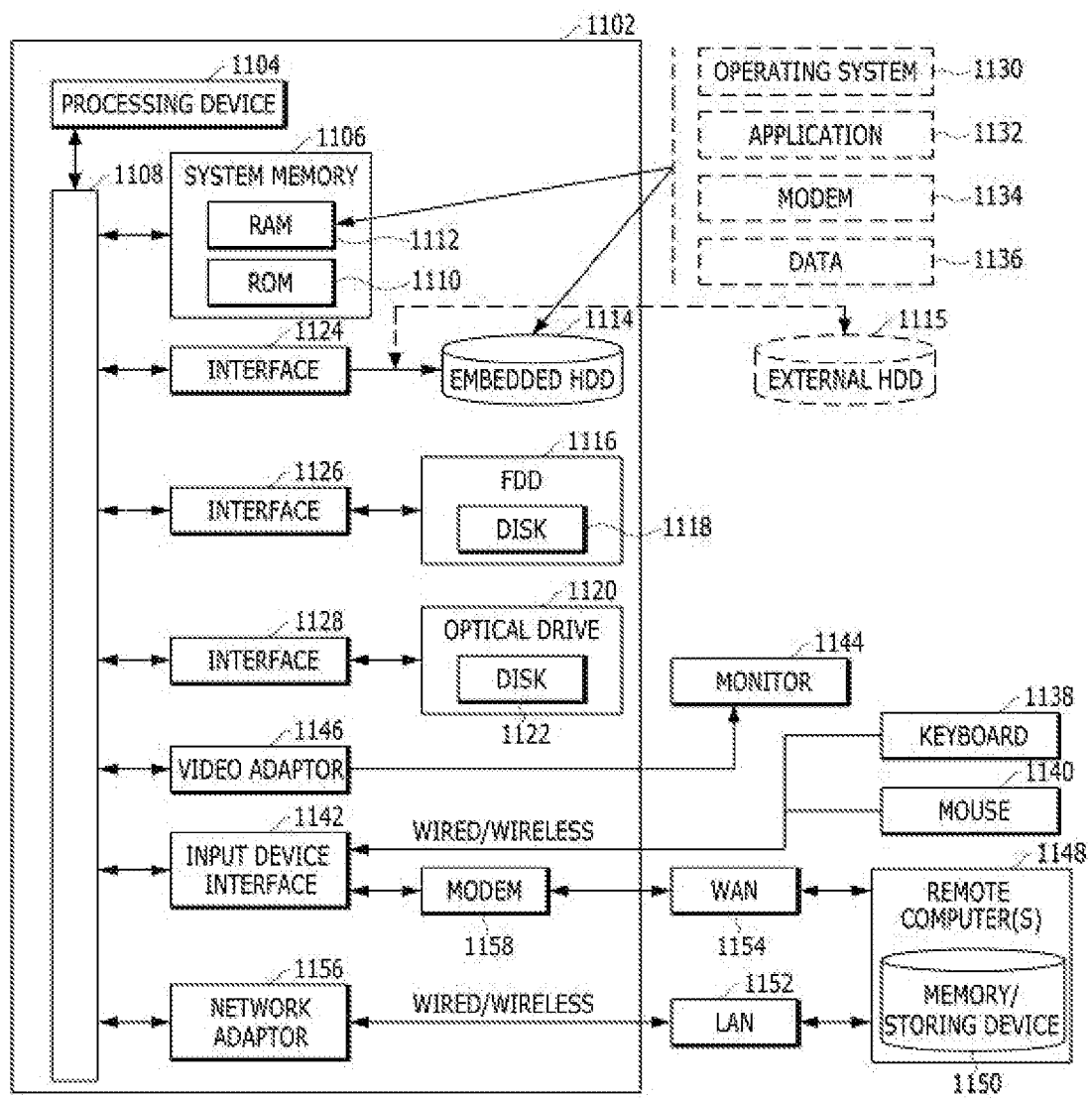

METHOD OF TRAINING OBJECT PREDICTION MODELS USING AMBIGUOUS LABELS

CROSS-REFERENCE TO RELATED APPLICATIONS

This application claims priority to and the benefit of Korean Patent Application No. 10-2022-0000169 filed in the Korean Intellectual Property Office on Jan. 3, 2022, the entire contents of which are incorporated herein by reference.

TECHNICAL FIELD

The present disclosure relates to a method of training an object prediction model using an ambiguous label, and more particularly, to a method of training a prediction model based on an ambiguous label including a plurality of discrimination information.

BACKGROUND ART

A mode that predicts objects included in an image (e.g., classifying or detecting objects) occupies a significantly large weight in drone and aviation image fields. In this case, various models are generally used to classify or detect the objects. However, among various models, it is evaluated that a potential value of a model using deep learning is large, and a lot of studies are conducted.

It is known that a deep learning model has a maximized performance when performing training by using data sets and numerous parameters generated through a method of manually attaching labels by an expert group, and this is referred to as supervised supervision in the present disclosure. However, a method of manually attaching the labels in order to construct the data set for training has a disadvantage of requiring a lot of cost and efforts. In order to improve the disadvantage, in recent years, a technology of expanding all labels by processing small-scale label data or performing labeling without an assistance of an expert through a data program scheme collected by a sensor or a computer has been proposed. In the present disclosure, this is referred to as unsupervised supervision. Further, in the present disclosure, a method of training a model by creating the label through a combination of multiple label creation functions and an optimization model in a situation in which only multiple rules of creating the label are known is referred to as weak supervised supervision. In this case, the label creation functions can create an ambiguous discrimination label including a plurality of discrimination information based on input data. For example, when an image including a cat is input into a specific label creation function, a label in which the object included in the image is cheetah or cat can be created. The expert can manually modify the object to the cat based thereon, but manually modifying vast data requires cost and time. That is, a new method of a model of classifying or detecting objects using the ambiguous discrimination label is required.

U.S. patent application Ser. No. 15/053,642 (Feb. 25, 2016) discloses a method of classifying images including a plurality of labels into a plurality of classes.

SUMMARY OF THE INVENTION

The present disclosure has been made in an effort to train a prediction model based on ambiguous discrimination labels including a plurality of discrimination information.

The objects of the present disclosure are not limited to the above-mentioned objects, and other objects and advantages of the present disclosure that are not mentioned can be understood by the following description, and will be more clearly understood by exemplary embodiments of the present disclosure. Further, it will be readily appreciated that the objects and advantages of the present disclosure can be realized by means and combinations shown in the claims.

An exemplary embodiment of the present disclosure provides a method of training an object prediction model by using a discrimination label including a plurality of discrimination information and input data by a computing device including at least one processor.

The method may include generating a prediction label based on the input data by using the prediction model. Further, the method may include generating a loss value based on a discrimination label and corresponding to the input data and the prediction label. Further, the method may include training the prediction model based on the loss value.

In an alternative exemplary embodiment, the discrimination label may include a plurality of binary values corresponding to a plurality of classes for indexing discrimination information, respectively. In this case, the binary value may be binary data that means True or False.

In an alternative exemplary embodiment, the prediction label may include a plurality of probability values corresponding to a plurality of classes for indexing prediction information, and a total sum of the plurality of probability values may be '1'. In an alternative exemplary embodiment, the prediction model may include a neural network based Softmax classifier.

In an alternative exemplary embodiment, the generating of the loss value based on the discrimination label and the prediction label may include outputting an inner product value set based on the discrimination label and the prediction label by using a first function. Further, the generating of the loss value based on the discrimination label and the prediction label may include outputting the loss value based on the inner product value set by using a second function.

In an alternative exemplary embodiment, the outputting of the inner product value set based on the discrimination label and the prediction label by using the first function may include outputting the inner product value set which is a set of respective inner product values by computing the inner product value n prediction labels and n discrimination labels corresponding to n input data, respectively.

In an alternative exemplary embodiment, the outputting of the loss value based on the inner product value set by using the second function may include calculating a log mean (logarithmic mean) based on the loss value.

Another exemplary embodiment of the present disclosure provides computer program stored in a non-transitory computer-readable storage medium. The computer program perform the following operations for training a prediction model by using input data and a discrimination label including a plurality of discrimination information when the computer program is executed by one or more processors. The operations may include an operation of generating a prediction label based on the input data by using the prediction model. Further, the operations may include an operation of generating a loss value based on a discrimination label and corresponding to the input data and the prediction label. Further, the operations may include an operation of training the prediction model based on the loss value.

Still another exemplary embodiment of the present disclosure provides a server.

The server includes: a processor comprising one or more cores; a network unit; and a memory, and the processor is further configured to perform the following operations for training a prediction model by using input data and a discrimination label including a plurality of discrimination information. In this case, the prediction model training operation may generate a prediction label based on the input data, generate a loss value based on a discrimination label and corresponding to the input data and the prediction label, and train the prediction model based on the loss value.

According to an exemplary embodiment of the present disclosure, a method of training a prediction model using ambiguous discrimination labels including a plurality of discrimination information can be provided.

BRIEF DESCRIPTION OF THE DRAWINGS

FIG. 1 is a block diagram of a computing device for training a model of detecting and classifying objects according to an exemplary embodiment of the present disclosure.

FIG. 2 is a schematic view illustrating a method of training a model of detecting and classifying objects generally known for comparing with an exemplary embodiment of the present disclosure.

FIG. 3 is a schematic diagram illustrating a network function according to an exemplary embodiment of the present disclosure.

FIG. 4 is a schematic view illustrating a method for using an ambiguous discrimination label including a plurality of discrimination information and input data corresponding to the ambiguous discrimination label in training a model of classifying and detecting objects according to an exemplary embodiment of the present disclosure.

FIG. 5 is a schematic view illustrating a method of generating and using the ambiguous discrimination label based on the input data unlike FIG. 4 in training the model of classifying and detecting objects according to an exemplary embodiment of the present disclosure.

FIG. 6 is a schematic view illustrating a method of generating a loss value by computing an inner product value of a prediction label based on a discrimination label according to an exemplary embodiment of the present disclosure.

FIG. 7 is a flowchart listing a process of training a model of detecting and classifying objects in order according to an exemplary embodiment of the present disclosure.

FIG. 8 is a flowchart listing a process of computing an inner product value set and a loss value by using a first function and a second function in order according to an exemplary embodiment of the present disclosure.

FIG. 9 is a normal and schematic view of an exemplary computing environment in which the exemplary embodiments of the present disclosure may be implemented.

DETAILED DESCRIPTION

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function, an artificial neural network, and a neural network may be used to be exchangeable.

A prediction model used in the present disclosure means a model used to predict or assume a value of a future state according to a specific purpose. In this case, the purpose may be to solve a problem of categorizing an image. In this case, the prediction model may be a neural network based model in order to achieve the purpose. In this case, the prediction model may be a model including a Softmax classifier which is a non-linear activation function. In this case, the Softmax classifier may be a function that converts a vector constituted by real number values of K which is a random natural number into a vector constituted by K real number values of which the sum is 1. Further, the Softmax classifier may be a function that predicts a probability that an n-dimension vector is received and belongs to each class when the number of classes to be classified is n.

Loss and cost disclosed in the present disclosure may be interchangeably used. In this case, the loss value may be generated from the loss function, and may be in proportion to a difference between a prediction result of the prediction model and correct answer data. In this case, the loss function may include a mean squared error technique and a cross entropy technique.

A binary value (binary data) disclosed in the present disclosure may be data configured by a binary format of 0 and 1. In this case, with respect to the 0, 'false' 1 may be used interchangeably with 'true'.

Computing the inner product value used in the present disclosure may be a computation of generating a scala value from two vectors to be computed.

The log mean disclosed in the present disclosure may be used interchangeably with a logarithmic mean. In this case, the log mean may be a computation of dividing a difference of values to be computed by a difference of a natural log value between the values to be computed.

The exemplary embodiments according to the present disclosure may train an object prediction model by a feed forward scheme based on the ambiguous label. That is, unlike the methods in the related art, the exemplary embodiments according to the present disclosure do not require a label disambiguation process, and even though the label disambiguation process or another feedback training is not additionally performed, a model having a high performance may be implemented.

FIG. 1 is a block diagram of a computing device for training a model of detecting and classifying objects according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 150 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

The techniques described herein may be used not only in the networks mentioned above, but also in other networks.

FIG. 2 is a schematic view illustrating a method of training a model of detecting and classifying objects generally known for comparing with an exemplary embodiment of the present disclosure.

FIG. 2 is just an example for describing the method of training a prediction model for classifying and discriminating objects in the related art, and components including input data 200, an discrimination label generator 210, an discrimination label 211, a prediction model 220, and a prediction label 221 included in the example of FIG. 2 do not represent components of an exemplary embodiment of the present disclosure.

Referring to FIG. 2, an example of the method of training the prediction model for classifying and discriminating objects in the related art, and problems of the example are described. The method of training the prediction model for classifying and discriminating objects in the related art includes a step of manually generating, by the discrimination label generator 210, the discrimination label 211 by discriminating one object included in the input data 200 based on the input data 200. In this case, the discrimination label 211 may be scala or vector type data including '0' or '1'. Further, each cell of the discrimination label 211 may include information on an discrimination candidate object. Further, the discrimination label generator 210 may substitute '1' into the cell including the information on the candidate object corresponding to the discriminated object. Further, the method may include a step of training the prediction model 220 based on the input data 200 and the discrimination label 211. In this case, when it is assumed that the prediction model 220 uses the manually generated discrimination label 211, accuracy may depend on the skill of the discrimination label generator 210. Further, since the using of the discrimination label 211 is manual work, there is a disadvantage in that large cost is generated in terms of time and money. On the contrary, when it is assumed that the prediction model 220 is trained by the unsupervised supervision, the discrimination label 211 is not definitely classified into one object, but may include ambiguous discrimination labels including a plurality of discrimination information such as cat or dog. When the model is trained based on the ambiguous label, there is a disadvantage in that the performance of the model may be still deteriorated by the method in the related art.

FIG. 3 is a conceptual diagram illustrating a neural network according to an embodiment of the present disclosure.

A neural network model according to an embodiment of the present disclosure may include a neural network for placing semiconductor devices. A neural network may consist of a set of interconnected computational units, which may generally be referred to as nodes. The "nodes" may also be called "neurons". The neural network consists of one or more nodes. The nodes (or neurons) configuring the neural network may be interconnected by one or more links.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

FIG. 4 is a schematic view illustrating a method for using a discrimination label 401 including a plurality of discrimination information and input data 400 corresponding to the discrimination label 401 in training a prediction model 410 of classifying and detecting objects according to an exemplary embodiment of the present disclosure.

Referring to FIG. 4, an exemplary embodiment of a training scheme performed by the processor 110 of the present disclosure is disclosed. As the one exemplary embodiment, the processor 110 of the computing device 100 according to an exemplary embodiment of the present disclosure may generate a prediction label 411 based on the input data 400 by using the prediction model 410. Further, the processor 110 may generate a loss value 440 based on the discrimination label 401 corresponding to the input data 400 and the prediction label 411. Further, the processor 110 may train the prediction model 410 based on the loss value 440. In this case, the input data 400 may include image data. Further, the discrimination label 401 may be vector type data including the discrimination information. In this case, the discrimination label 401 may be data corresponding to the input data 400, and may be generated from a data set in which the input data 400 and the discrimination label 401 form a pair. Further, the discrimination label 401 may be the ambiguous discrimination label including a plurality of discrimination information. In this case, the discrimination information may be data representing a class of an object included in the input data 400. For example, the discrimination information may be "the class of the input data 400 is the cat", and may be "the class of the input data 400 is the cat or a bird". Further, the prediction label 411 may be vector type data including the prediction information. Further, the prediction label 411 may be generated based on a neural network based Softmax classifier. In this case, the Softmax classifier may be included in the prediction model 410. Further, the loss value 440 may be generated based on a loss value computation model 420. In this case, the processor 110 may output an inner product value set by using a first function based on the discrimination label 401 and the prediction label 411 by using the loss value computation model 420. For example, the first function may generate each inner product value based on the discrimination label 401 and the prediction label 411 of each input data 400 in relation to a plurality of input data 400, and then output an inner product value set including a plurality of inner product values for the plurality of input data 400. Further, the processor 110 may output the loss value 440 based on the inner product value set by using a second function. For example, the second function may compute a log mean (logarithmic mean) with respect to the inner product value set, and output the loss value 440 based on the computation.

FIG. 5 is a schematic view illustrating a method of generating and using the discrimination label based on the input data unlike FIG. 4 in training the model of classifying and detecting objects according to an exemplary embodiment of the present disclosure.

Referring to FIG. 5, an exemplary embodiment of a weak supervised supervision scheme performed by the processor 110 of the present disclosure is disclosed. The processor 110 of the computing device 100 according to an exemplary embodiment of the present disclosure may generate a discrimination label 511 based on input data 500 by using a discrimination model 510. Further, the processor 110 may generate the prediction label based on the input data 500 by using a prediction model 520. Further, the processor 110 may generate a loss value 540 based on the discrimination label 511 corresponding to the input data 500 and the prediction label 521. Further, the processor 110 may train the prediction model 520 based on the loss value 540. In this case, the input data 500 may include image data. Further, the discrimination label 511 may be vector type data including the discrimination information. In this case, the discrimination label 511 may be data corresponding to the input data 500, and may be generated from a data set in which the input data 500 and the discrimination label 511 form a pair. Further, the discrimination label 511 may be the ambiguous discrimination label including a plurality of discrimination information. In this case, the discrimination information may be data representing a class of an object included in the input data 500. For example, the discrimination information may be "the class of the input data 500 is the cat", and may be "the class of the input data 500 is the cat or a bird". Further, the prediction label 521 may be vector type data including the prediction information. Further, the prediction label 521 may be generated based on a neural network based Softmax classifier. In this case, the Softmax classifier may be included in the prediction model 520. Further, the loss value 540 may be generated based on a loss value computation model 530. In this case, the processor 110 may output the inner product value set by using the first function based on the discrimination label 511 and the prediction label 521 by using the loss value computation model 530. Further, the processor 110 may output the loss value 540 based on the inner product value set by using a second function. In this case, the processor 110 computes an inner product value of n prediction labels and n discrimination labels corresponding to n input data, respectively by using the first function to output the inner product value set which is a set of respective inner product values. Further, the processor 110 may compute the log mean with respect to the inner product value set by using the second function, and output the loss value 540 based on the computation. In this case, the discrimination model 510 may be a neural network model or a machine learning model, but is not limited thereto.

FIG. 6 is a schematic view illustrating a method of generating a loss value by computing an inner product value of a prediction label based on a discrimination label according to an exemplary embodiment of the present disclosure.

Referring to FIG. 6, an exemplary embodiment of the method of generating, by the processor 110, the loss value by computing the inner product value of the prediction label 610 based on the discrimination label is disclosed. By the method, the processor may generate the prediction label {cat (0.4), dog (0.1), bird (0.3), fish (0.1), raccoon (0.1)} 610 in which cat, dog, bird, and fish classes are indexed in each cell and which has a probability value between 0 and 1 by using the prediction model based on the input data including the cat. Further, the processor 110 may use a discrimination label {cat (1), dog (0), bird (1), fish (0), raccoon (0)} in which an index output from input data which is the same as the input data is equal and which has a binary value of '0' or '1'. In this case, the inner product value may be a value acquired by multiplying cells of each of the prediction label 610 and the discrimination label 600 by a value of a cell indicating the same animal, and computing a total sum of the multiplication values. In this case, since values of the prediction labels of a cell 611 indexed with the cat and a cell 612 indexed with the bird in which a cell value of the discrimination label is 1 are '0.4' and '0.3', respectively, it may be known that (0.4*1)+(0.1*0)+(0.3*1)+(0.1*0)+ (0.1*0)=0.7 is the inner product value of the prediction label 610 and the discrimination label 600 corresponding to the input data. In this case, those skilled in the art may appreciate that the number of classes may be arbitrarily selected, and the prediction model may be effectively trained based on the method even based on the discrimination label including a plurality of classes.

Referring to FIG. 6, an exemplary embodiment of a step of generating, by the processor 110 of the present disclosure, the prediction label 610 based on the input data by using the prediction model is disclosed. The method may include a step of outputting, by the processor 110, the inner product value set by using the first function based on the prediction label 610 and the discrimination label 600. Further, the method may include a step of generating the loss value by using the second function based on the inner product value set. In this case, the first function may generate each inner product value based on the discrimination label 600 and the prediction label 610 of each input data in relation to a plurality of input data, and then output an inner product value set including a plurality of inner product values for the plurality of input data. Further, the second function may include a step of calculating the log mean based on the inner product value set.

$$\overline{S}_{\theta,i} = \text{SOFTMAX}(f_\theta)(x_i))$$ [Equation 1]

Referring to Equation 1, one detailed exemplary embodiment of the step of generating the prediction label by the processor 110 of the present disclosure is disclosed. In this case, i used for convenience of description in the one exemplary embodiment may be a natural number. Further, an expression X_i may mean "i-th 'X'".

Referring to Equation 1, $\overline{S}_{\theta,i}$ may represent a prediction label_i($\overline{S}_{\theta,i}$) corresponding to i-th input data_i($x_i$) Further, $x_i$ may be i-th input data_i($x_i$) Further, $f_\theta$ may be a function including a trainable weight.

That is, the processor 110 may output $f_\theta(x_i)$ by using the function $f_\theta$ including the trainable weight based on the input data_i($x_i$). Further, the prediction label_i($\overline{S}_{\theta,i}$) may be output by using a Softmax (SOFTMAX( )) function based on the $f_\theta(x_i)$.

$$\hat{l}_n(\theta) = -\frac{1}{n}\sum_{i=1}^{n}\log(\langle \overline{S}_{\theta,i}, S_i \rangle)$$ [Equation 2]

Referring to Equation 2, one detailed exemplary embodiment of a step of outputting the inner product value set by using the first function and a step of generating the loss value by using the second function by the processor 110 of the present disclosure is disclosed.

In this case, referring to Equation 2, $\hat{l}_n(\theta)$ may be the loss value $\hat{l}_n(\theta)$. Further, may $S_i$ be a discrimination label_i($S_i$) of the input data i. Further, ($\overline{S}_{\theta,i}$ $S_i$) may be an inner product value ($\overline{S}_{\theta,i}$ $S_i$) of the prediction label_i($\overline{S}_{\theta,i}$) and the discrimination label_i($\overline{S}_{\theta,i}$). Further, n may mean a maximum value (n) of the inputted input data.

Based on the aforementioned contents, the step of outputting the inner product value set by using the first function by the processor 110 may be computing the inner product value ($\overline{S}_{\theta,i}$ $S_i$) of the prediction label_i($\overline{S}_{\theta,i}$) and the discrimination label_i($S_i$). Further, the step of generating the loss value by using the second function by the processor 110 may include a step of computing an inner product value of all of n input data by the processor 110 and a step of computing the log mean (logarithmic mean) based on the inner product value set which is a sum of inner product values of all of n input data. Those skilled in the art may appreciate that the discrimination label including the plurality of discrimination information may be used through the exemplary embodiment. Further, it may be appreciated that the loss value may be output by computing the prediction label based on the discrimination label.

FIG. 7 is a flowchart listing a process of training the prediction model (e.g., object detecting and classifying model) based on input data and an ambiguous discrimination label including a plurality of discrimination information by a computing device in order according to an exemplary embodiment of the present disclosure.

Referring to FIG. 7, in step S701, the processor 110 according to an exemplary embodiment of the present disclosure may generate a prediction label based on input data by using a prediction model. In this case, the discrimination label may include a plurality of classes for indexing discrimination information and a plurality of binary values corresponding to the plurality of classes, respectively. Further, the prediction label may include a plurality of classes for indexing prediction information and a plurality of probability values corresponding to the plurality of classes, respectively, in which a total sum of the plurality of probability values may be '1'. Further, the prediction model may include the neural network based Softmax classifier.

Referring to FIG. 7, in step S702, the processor 110 according to an exemplary embodiment of the present disclosure may generate a loss value based on a discrimination label corresponding to the input data and the prediction label. In this case, the step of generating the loss value based on the discrimination label and the prediction label may include a step of outputting an inner product value set based on the discrimination label and the prediction label by using a first function and a step of outputting the loss value based on the inner product value set by using a second function. In this case, the step of outputting the inner product value set based on the discrimination label and the prediction label by using the first function may include a step of outputting the inner product value set which is a set of respective inner product values by computing inner product values of n prediction labels and n discrimination labels corresponding to n input data, respectively. Further, the step of outputting the loss value based on the inner product value set by using the second function may include a step of calculating a log mean based on the inner product value set.

Referring to FIG. 7, in step S703, the processor 110 according to an exemplary embodiment of the present disclosure may train the prediction model based on the loss value.

FIG. 8 is a flowchart listing a process of computing an inner product value set and a loss value by using a first function and a second function in order according to an exemplary embodiment of the present disclosure.

Referring to FIG. 8, in step S801, the processor 110 according to an exemplary embodiment of the present disclosure may output the inner product value set based on the discrimination label and the prediction label by using the first function. In this case, in step S801, the processor 110 computes an inner product value of n prediction labels and n discrimination labels corresponding to n input data, respectively to output the inner product value set which is a set of respective inner product values. Further, in step S802, the processor 110 according to an exemplary embodiment of the present disclosure may output the loss value based on the inner product value set by using the second function. In this case, in step S802 above, the processor 110 may calculate a log mean based on the inner product value set. For example, 10 prediction labels may be generated based on 10 input data having one class of dog, bear, raccoon, cat, or horse, and 10 discrimination labels corresponding to 10 input data may be extracted from a random discrimination label database. Further, an inner product value is computed with respect to a corresponding discrimination label and a corresponding prediction label to output 10 inner product values. In this case, the inner product value set having 10 inner product values may be output and the log mean of the inner product value set may be calculated. In this case, the loss value may be output based on the log mean value, and the Softmax classifier of the prediction model may be trained based on the output loss value. In this case, those skilled in the art may appreciate that the number of classes may be arbitrarily selected, and the prediction model may be effectively trained based on the method even based on the discrimination label including a plurality of classes.

The exemplary embodiments according to the present disclosure may train a prediction model by a feed forward scheme based on the ambiguous label. That is, unlike the methods in the related art, the exemplary embodiments according to the present disclosure do not require a label disambiguation process, and even though the label disambiguation process or another feedback training is not additionally performed, a model having a high performance may be implemented.

FIG. 9 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

The invention claimed is:

1. A method of training a prediction model of an artificial neural network to predict objects included in a digital image by using a discrimination label including a plurality of discrimination information and input data, the method performed by a computing device including at least one processor, the method comprising:
   generating a prediction label based on the input data by using the prediction model of the artificial neural network;
   generating a loss value based on a discrimination label corresponding to the input data and the prediction label, wherein the input data comprises digital image data, and wherein the discrimination label is an ambiguous discrimination label comprising a plurality of discrimination information, and wherein the discrimination information represents a class of an object included in the input data;
   training the prediction model of the artificial neural network to automatically classify and detect objects included in the digital image without manual input by using a feed forward scheme based on the discrimination label by updating weights of the prediction model of the artificial neural network, based on the loss value, wherein generating the loss value includes:
      outputting an inner product value set based on the discrimination label and the prediction label generated by the prediction model of the artificial neural network, by using a first function, and
      outputting the loss value based on the inner product value set by using a second function,
   wherein the outputting of the inner product value set based on the discrimination label and the prediction label by using the first function includes:
      outputting the inner product value set which is a set of respective inner product values by computing the inner product value of n prediction labels and n discrimination labels corresponding to an input data, respectively,
   wherein the outputting of the loss value based on the inner product value set by using the second function includes:
      calculating a log mean based on the inner product value set.

2. The method of claim 1, wherein the discrimination label includes a plurality of binary values corresponding to a plurality of classes for indexing discrimination information, respectively.

3. The method of claim 1, wherein the prediction label includes a plurality of probability values corresponding to a plurality of classes for indexing prediction information, respectively, and a total sum of the plurality of probability values is 1.

4. The method of claim 1, wherein the prediction model includes a neural network based Softmax classifier, and the training of the prediction model based on the loss value includes training the Softmax classifier based on the loss value.

5. A computer program stored in a non-transitory computer-readable storage medium, wherein the computer program executes the following operations for training a prediction model of an artificial neural network to predict objects included in a digital image by using input data and a discrimination label including a plurality of discrimination information when the computer program is executed by one or more processors, the operations comprising:
   an operation of generating a prediction label based on the input data by using the prediction model of the artificial neural network;
   an operation of generating a loss value based on a discrimination label corresponding to the input data and the prediction label, wherein the input data comprises digital image data, and wherein the discrimination label is an ambiguous discrimination label comprising a plurality of discrimination information, and wherein the discrimination information represents a class of an object included in the input data;
   an operation of training the prediction model of the artificial neural network to automatically classify and detect objects included in the digital image without manual input by using a feed forward scheme based on the discrimination label by updating weights of the prediction model of the artificial neural network, based on the loss value,
   wherein the operation of generating the loss value includes:
      an operation of outputting an inner product value set based on the discrimination label and the prediction label generated by the prediction model of the artificial neural network, by using a first function, and
      an operation of outputting the loss value based on the inner product value set by using a second function,
   wherein the operation of outputting the inner product value set based on the discrimination label and the prediction label by using the first function includes:
      an operation of outputting the inner product value set which is a set of respective inner product values by computing the inner product value of n prediction labels and n discrimination labels corresponding to an input data, respectively, wherein the outputting of the loss value based on the inner product value set by using the second function includes:

calculating a log mean based on the inner product value set.

6. A computing device comprising:

a processor comprising one or more cores;

a network unit; and a memory, wherein the processor is configured to:

perform operations for training a prediction model of an artificial neural network to predict objects included in a digital image by using input data and a discrimination label including a plurality of discrimination information, wherein the operations include:

generating a prediction label based on the input data by using the prediction model of the artificial neural network, generating a loss value based on a discrimination label corresponding to the input data and the prediction label, wherein the input data comprises digital image data, and wherein the discrimination label is an ambiguous discrimination label comprising a plurality of discrimination information, and wherein the discrimination information represents a class of an object included in the input data, and training the prediction model of the artificial neural network to automatically classify and detect objects included in the digital image without manual input by using a feed forward scheme based on the discrimination label by updating weights of the prediction model of the artificial neural network, based on the loss value, wherein generating the loss value includes :

outputting an inner product value set based on the discrimination label and the prediction label by using a first function, and outputting the loss value based on the inner product value set by using a second function, wherein outputting the inner product value set based on the discrimination label and the prediction label generated by the prediction model of the artificial neural network, by using the first function includes:

outputting the inner product value set which is a set of respective inner product values by computing the inner product value of n prediction labels and n discrimination labels corresponding to an input data, respectively, wherein the outputting of the loss value based on the inner product value set by using the second function includes:

calculating a log mean based on the inner product value set.

* * * * *